Figure 1:
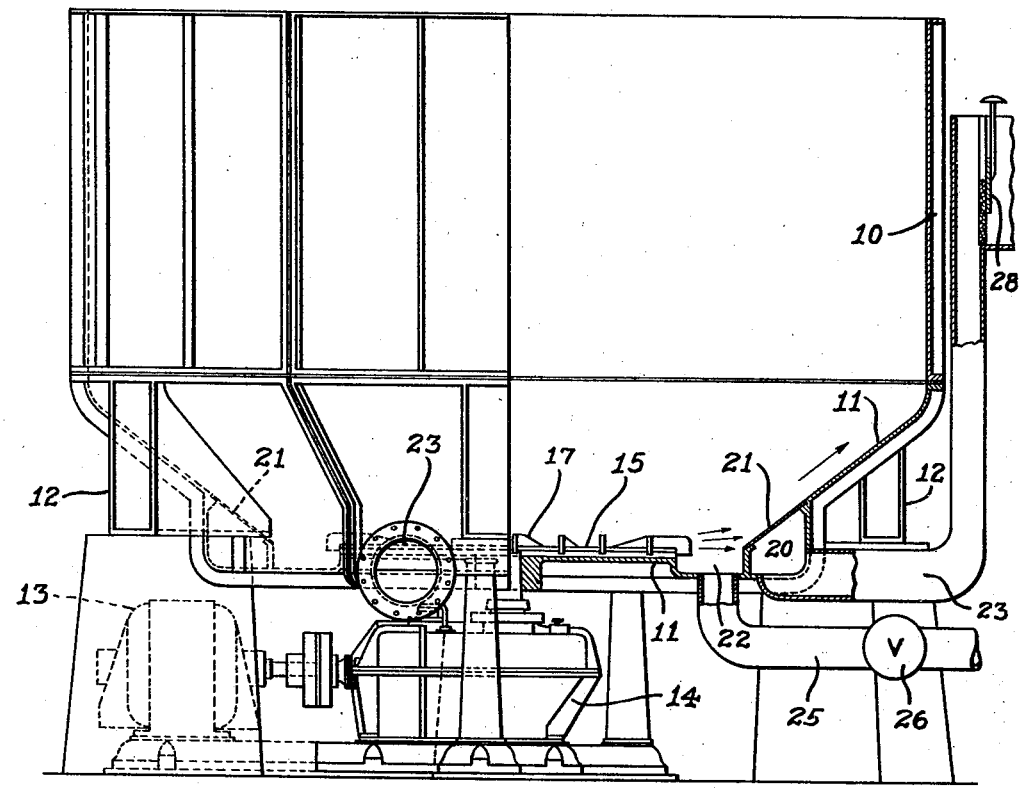

March 20, 1945. H. D. MARTINDALE 2,371,837
APPARATUS FOR PULPING AND SCREENING PAPERMAKING MATERIALS
Filed April 29, 1941

Inventor
Homer D. Martindale
By Marechal & Noe
Attorney

Patented Mar. 20, 1945

2,371,837

UNITED STATES PATENT OFFICE 2,371,837

APPARATUS FOR PULPING AND SCREENING PAPERMAKING MATERIALS

Homer D. Martindale, Middletown, Ohio, assignor to The Black-Clawson Company, Hamilton, Ohio, a corporation of Ohio Application April 29, 1941, Serial No. 390,969

5 Claims. (Cl. 92—23)

This invention relates to apparatus for treating fibrous material and more particularly to apparatus for pulping and screening material used in the manufacture of paper.

One object of the invention is the provision of an apparatus of the character mentioned, and including a rotatable propelling head operable adjacent to the bottom of a vat and arranged in cooperative relationship with an outwardly and upwardly inclined annular screen through which material fine enough to pass through the screen openings is withdrawn while some of the circulating material undergoing treatment is forced upwardly along the screen to effectively dislodge material tending to clog the screen openings.

Another object of the invention is the provision of an apparatus of such character, in which the screen is outwardly spaced from the periphery of the rotatable head and an annular well is provided between the screen and the head for the collection and withdrawal of heavy impurities.

Another object of the invention is the provision of a pulping apparatus including a vat and a rotatable head operable adjacent to the bottom of the vat to provide outward and upward circulation along the outer portions of the vat and a return flow downwardly towards the head, and a screen arranged at such an angle of inclination in a zone outwardly of the head that it will be kept clean without the use of mechanical scrapers or the like and merely by the material sweeping along its surface, a substantial component of the inertia of the outwardly propelled material being effective in forcing material through the screen openings.

Other objects and advantages of the invention will be apparent from the following description, the appended claims, and the accompanying drawing.

Figure 2:
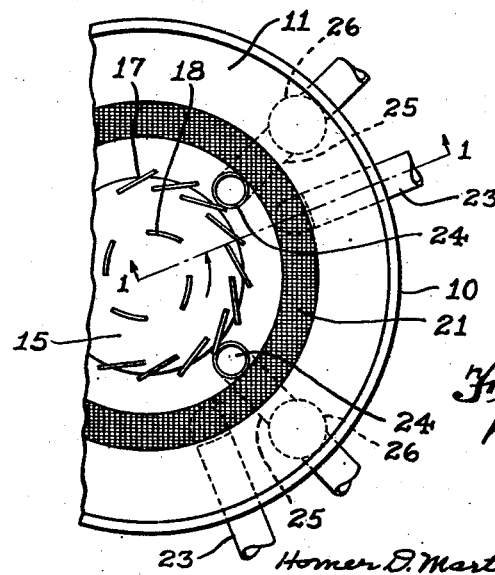

In the drawing,

Fig. 1 is a side elevation, partly in vertical section on the line 1—1 of Fig. 2, showing an apparatus embodying the present invention; and Fig. 2 is a top plan view of one side of the apparatus.

In the drawing, in which the preferred embodiment of the invention is shown, 10 designates the cylindrically extending upper wall portions of a pulper vat or tank in which fibrous material is pulped in the manufacture of paper. The vat is open at its upper end to receive the material to be treated, the upper wall portions 10 extending from lower wall portions 11 which close the bottom of the vat and which are carried by supports 12 of any suitable character. Arranged below the vat is a motor 13 connected through a suitable gear transmission mechanism, contained in a housing 14, to a rotatable shaft which extends up through an opening in the lower wall portions of the vat and which carries a rotatable pulping head 15 arranged adjacent the bottom of the vat and above its bottom wall. The rapid rotation of the head 15 provides an effective circulation outwardly and then upwardly along the outer portions of the vat with a return down flow towards the head 15.

The head 15 is provided with a series of blades 17 carried by its peripheral portions and projecting upwardly and preferably projecting out beyond the periphery of the head as indicated in Figs. 1 and 2. These blades are arranged at a very large angle to a radial direction, projecting outwardly and rearwardly with respect to the direction of rotation so they exert a large outward propelling effect on the material near the bottom of the vat. The material in the vat is thus drawn downwardly towards the head and is then swept outwardly, then moving upwardly along the walls of the vat before returning again to the pulping head. The head 15 may also have additional blades 18 arranged part way between the vertical axis of rotation and the outer blades 17 and projecting upwardly from the top of the head and producing an effective pulping action on the material undergoing treatment.

Adjacent the bottom of the vat is an annular chamber or compartment 20 partitioned from the space above the head 15 by a screen plate 21 which is of frusto-conical form so that it extends outwardly and upwardly at a considerable angle to a horizontal plane and to the direction in which the material undergoing treatment is thrown outwardly by the blades 17 during the rapid rotation of the head. This screen 21 is arranged around the head 15, the lower end of the screen, as shown, being spaced outwardly from the ends of the blades and substantially horizontally opposite from the blades, the space between the bottom of the screen and the blades 17 forming an annular collection trough 22 in which heavy metal pieces can collect for disposal through a suitable dump opening or openings 24 and discharge pipe or pipes 25 controlled by shut off valves 26 which are normally closed during the pulping operation. The pulping takes place as a continuous operation.

The screen 21 has a considerable angle of inclination, in a range of from 15° to 40° from the horizontal plane depending upon the degree of selectivity desired in the screening operation and the rate at which material is to be withdrawn through the screen. A greater rate of withdrawal of the pulped material can be employed with the screen at an angle of about 15° without clogging the openings, and the screening action will give a finer selectivity. In the angular range mentioned the inclination angle is such that a large proportion of the inertia of the material propelled outwardly very rapidly in a generally horizontal direction by the blades 17 is effective in forcing that material that has been sufficiently pulped to pass through the screen, into the compartment 20, while a large part of this inertia, as the material impinges on the screen, produces the upwardly sweeping flow along the surface of the screen plate to dislodge particles that tend to clog the screen openings so that the screen will be kept clean without the necessity of using mechanical scrapers. With an angle substantially in excess of 40° the component of the outward force producing circulation of the material upwardly and outwardly in the vat and cleaning the screening openings will be inadequate for efficient operation, and with an angle substantially less than 15°, the component of the force of the outwardly propelled material effective in forcing material that has been sufficiently pulped to pass through the screen openings will be too small for efficient operation in that respect. With the screen arranged at an angle of from 15° to 40°, however, the material thrown out in a generally horizontal direction by the blades 17 impinges on the screen at an efficient angle, giving an efficient proportioning of the two effects, i. e., the cleaning effect on the screen and the propelling action of material through the screen openings.

The flow through the screen results from the combined effect of the difference in pressure head due to the height of the material in the vat and the pressure prevailing in the chamber 20 at the lower side of the screen, added to the effect of the inertia of the outwardly moving material. The material flowing into the compartment 20 is carried away through discharge pipes 23, at a rate governed by a suitable regulating dam 28 or other suitable flow controlling device adjustable to provide a continuous withdrawal of the pulped material at a suitable rate so that the screen openings will not become clogged. The difference in the static pressure heads on opposite sides of the screen may be about one pound per square inch to give a suitable withdrawal regulation.

The screen openings are preferably round holes suitably spaced apart and having a diameter of from ¼ inch to 1 inch or more dependent upon the fineness of the screened material desired. As one example of a suitable construction, the screen may be inclined at an angle of 40° with ¼ inch holes, and the vat may be about 15 feet in diameter, to provide for the continuous pulping and screening of stock of from about 1% to 8% consistency or more, with a total capacity of about 9,000 gallons. The body of stock during pulping and screening may extend up to a point about six feet above the bottom of the vat. The rotatable head 15, which may have a diameter of about 6 feet, may be rotated at a peripheral speed of the order of 3,000 to 4,000 feet per minute to give an effective pulping action and an effective selective screening and screen cleaning action due to the rapid outward propulsion of the material in the lower portion of the vat in a generally horizontal direction towards the screen.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for treating fibrous material in suspension comprising a vat, a rotary head arranged for rotation about a substantially vertical axis adjacent the bottom of the vat and having blades adapted for outward propelling effect on the material treated, an annular screen extending outwardly from the zone adjacent the periphery of the head, the bottom of the vat providing an annular well between the periphery of the head and the screen for the collection of heavy material, an annular compartment for screened material below said screen and partitioned thereby from the space in the vat above the head, said screen having an outward upward inclination at an angle of from 15° to 40° to the horizontal so that the inertia forces of the outwardly propelled material will be effective to force sufficiently fine fibrous material through the screen openings and to sweep the other suspended material over and across the upper side of the screen to dislodge material tending to clog the screen openings.

2. Apparatus for treating fibrous material in suspension comprising a vat, a rotary head arranged for rotation about a substantially vertical axis adjacent the bottom of the vat and having blades adapted for outward propelling effect on the material treated, an annular screen extending outwardly from the zone adjacent the periphery of the head, the bottom of the vat providing an annular well between the periphery of the head and the screen for the collection of heavy impurities, means for withdrawing heavy impurities from the well, an annular compartment for screened material in suspension below said screen and partitioned thereby from the space in the vat above the head, means for withdrawing such screened material from said compartment, said screen having an outward upward inclination at an angle of from 15° to 40° to the horizontal, the construction being such that the inertia forces of the outwardly propelled material is effective to force material through the screen openings and to sweep the upper side of the screen and dislodge material tending to clog the screen openings.

3. Apparatus for treating fibrous material in suspension comprising a vat, a rotary head arranged adjacent the bottom of the vat having blades inclined outwardly and rearwardly to the direction of rotation at a very large angle to the radius and adapted for outward propelling effect on the material treated, an annular screen extending outwardly from the zone adjacent the periphery of the head, the bottom of said vat providing an annular well between the periphery of the head and the screen for the collection of heavy impurities, said vat having outwardly and upwardly inclined wall portions substantially flush with the peripheral portions of the screen, an annular compartment for screened material in suspension below said screen and partitioned thereby from the space in the vat above the head, said screen having an outward upward inclination at an angle of from 15° to 40° to the plane of movement of the material the construction being such that as said suspension of material leaves the head the inertia forces of the outwardly propelled material are effective in forcing sufficiently fine material through the screen openings, and also effective in sweeping suspended material across the upper side of the screen and dislodging material tending to clog the screen openings.

4. Apparatus for treating fibrous material in suspension comprising a vat, a rotary head arranged for rotation about a substantially vertical axis adjacent the bottom of the vat and having blades adapted for outward propelling effect on the material treated, an annular screen extending outwardly from the zone adjacent the periphery of the head, an annular compartment for screened material below said screen and partitioned thereby from the space in the vat above the head, said screen having an outward upward inclination at an angle of from 15° to 40° to the horizontal so that the inertia forces of the material outwardly propelled by the head are effective in forcing sufficiently fine material through the screen openings and also effective in sweeping the unscreened fibrous material across the upper side of the screen and dislodging material tending to clog the screen openings.

5. Apparatus for treating fibrous material in suspension comprising a vat, a rotary head arranged for rotation about a substantially vertical axis adjacent the bottom of the vat and having blades adapted for outward propelling effect on the material treated, an inclined screen extending outwardly and upwardly from the zone adjacent the periphery of the head, a closed compartment for screened material below said screen and partitioned thereby from the space in the vat above the head, said screen having upward inclination at an angle of from 15° to 40° to a horizontal plane such that under the inertia forces effectively in operation the flowing fibrous suspension will flow upwardly across the screen, with the inertia forces such that the sufficiently refined fibrous material is caused to pass through the screen openings and the insufficiently refined part of such suspension of material is effective to dislodge material tending to clog the screen openings and to produce an upward recirculation through the vat.

HOMER D. MARTINDALE.